(12) United States Patent
Cho et al.

(10) Patent No.: US 10,320,518 B2
(45) Date of Patent: Jun. 11, 2019

(54) APPARATUS AND METHOD FOR PREVENTING INFORMATION LEAKAGE

(71) Applicant: ELECTRONICS AND TELECOMMUNICATIONS RESEARCH INSTITUTE, Daejeon (KR)

(72) Inventors: Hui-Rae Cho, Daejeon (KR); Jin-Hyun Kim, Sejong-si (KR); In-Ho Hwang, Daejeon (KR); Sae-Hoon Ju, Daejeon (KR); Kyung-Hoon Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/807,917

(22) Filed: Nov. 9, 2017

(65) Prior Publication Data

US 2018/0191458 A1 Jul. 5, 2018

(30) Foreign Application Priority Data

Dec. 29, 2016 (KR) ........................ 10-2016-0182381

(51) Int. Cl.
*H04L 27/26* (2006.01)
*H04K 3/00* (2006.01)

(52) U.S. Cl.
CPC ........... *H04K 3/68* (2013.01); *H04L 27/2602* (2013.01); *H04L 27/2614* (2013.01); *H04L 27/2628* (2013.01)

(58) Field of Classification Search
CPC combination set(s) only.
See application file for complete search history.

(56) References Cited

U.S. PATENT DOCUMENTS 7,889,866 B2 2/2011 Masugi et al.
8,040,235 B2 * 10/2011 Koga ...................... H04B 3/54
340/538

(Continued)

FOREIGN PATENT DOCUMENTS

JP 2008-283520 A 11/2008
JP 4629035 B2 2/2011
JP 4673147 B2 4/2011

OTHER PUBLICATIONS

Wim Van Eck, "Electromagnetic Radiation from Video Display Units: An Eavesdropping Risk," Computers & Security, vol. 4, pp. 269-286, 1985.

(Continued)

*Primary Examiner* — Linda Wong
(74) *Attorney, Agent, or Firm* — LRK Patent Law Firm

(57) ABSTRACT

An apparatus and a method for preventing an information leakage. The apparatus for preventing the information leakage includes a shielding signal pattern generation unit configured to generate a shielding signal pattern including a radiation band and a radiation suppression band; a shielding signal generation unit configured to generate an electromagnetic leakage shielding signal corresponding to an Orthogonal Frequency Division Multiplexing (OFDM) scheme by using the shielding signal pattern; a signal amplification unit configured to amplify a transmitting power of the electromagnetic leakage shielding signal; and an antenna unit configured to transmit the amplified electromagnetic leakage shielding signal.

18 Claims, 8 Drawing Sheets

(56) References Cited

U.S. PATENT DOCUMENTS

| | | | |
|---|---|---|---|
| 8,699,542 B2 | 4/2014 | Mori et al. | |
| 2006/0138862 A1* | 6/2006 | Wakisaka | H04B 3/04 307/3 |
| 2014/0168012 A1* | 6/2014 | Mankowski | H04W 4/20 342/359 |

OTHER PUBLICATIONS

Hidenori Sekiguchi, "Information Leakage of Input Operation on Touch Screen Monitors Caused by Electromagnetic Noise," IEEE EMC 2010, vol. 4, pp. 127-131, 2010.

Hidenori Sekiguchi et al., "Estimation of Receivable Distance for Radiated Disturbance Containing Information Signal from Information Technology Equipment," IEEE EMC 2011, vol. 4, pp. 942-945, 2011.

* cited by examiner

APPARATUS AND METHOD FOR PREVENTING INFORMATION LEAKAGE

CROSS REFERENCE TO RELATED APPLICATION

This application claims the benefit of Korean Patent Application No. 10-2016-0182381, filed Dec. 29, 2016, which is hereby incorporated by reference in its entirety into this application.

BACKGROUND OF THE INVENTION

1. Technical Field

The present invention relates to a technology for preventing an information leakage caused by an electromagnetic leakage, and more particularly, a technology for preventing information contained in the electromagnetic leakage which is generated from an information device from being collected and reproduced by an attacker.

2. Description of Related Art

An electromagnetic wave which is leaked and radiated from an inside of a device, an interface cable, a power cable of electronic information devices such as a computer, a monitor may contain data handled inside the device. Further, the leaked electromagnetic wave signal can be received and analyzed wirelessly over a long distance, and can be restored to original information through a signal processing process.

In order to prevent the information leakage caused by the electromagnetic leakage, a technology for generating a synchronized leakage preventing signal by analyzing an image signal radiated from an information device, and superimposing this on the electromagnetic leakage has been developed.

Further, in order to enhance a shielding performance of the leakage information, a technology for performing a spread spectrum modulation processing to a horizontal or a vertical synchronization clock signal, and outputting a Pseudo Noise (PN) code as a modulation pattern signal has been proposed. Further, in order to the electromagnetic leakage which is a fine signal cannot be collected and analyzed, a technology of a jamming scheme for radiating a noise signal in the same space has also been developed.

However, in the conventional technologies, it is difficult to expect an effective blocking performance for every frequency band within a broadband frequency range of 1 GHz or less, in which the electromagnetic leakages mainly occur. Further, the conventional technologies used a hardware notch filter to allow an authorized normal communication, for these reasons, a complexity and a size of an equipment has been increased, and the frequency that can be suppressed has been extremely limited.

Accordingly, it is necessary to develop a technology capable of blocking the information leakage caused by the electromagnetic leakage while permitting a communication of an authorized frequency within a specific space.

PRIOR ART DOCUMENTS

Patent Documents (Patent Document) Japanese Patent No. 4637135 (Date of Publication: Dec. 3, 2010, entitled "Information leakage preventing device, and apparatus including the same")

SUMMARY OF THE INVENTION

An object of the present invention is to maximize the effect of preventing an information leakage caused by an electromagnetic leakage by transmitting an equal electromagnetic leakage shielding signal.

Furthermore, an object of the present invention is to generate the electromagnetic leakage shielding signal by selectively setting a radiation frequency or a radiation suppression frequency so that the shielding signal generation can be performed efficiently and concisely.

Furthermore, an object of the present invention is to enable a communication for an authorized frequency, and to simultaneously block an information leakage caused by an electromagnetic leakage.

Furthermore, an object of the present invention is to readily change a radiation frequency and a radiation suppression frequency so that it can immediately cope with a rapid change of a communication environment.

Furthermore, an object of the present invention is to transmit an electromagnetic leakage shielding signal suitable for a local or a national situation by using a single equipment.

In order to accomplish the above objects, the present invention provides an apparatus for preventing an information leakage, including: a shielding signal pattern generation unit configured to generate a shielding signal pattern including a radiation band and a radiation suppression band; a shielding signal generation unit configured to generate an electromagnetic leakage shielding signal corresponding to an Orthogonal Frequency Division Multiplexing (OFDM) scheme by using the shielding signal pattern; a signal amplification unit configured to amplify a transmitting power of the electromagnetic leakage shielding signal; and an antenna unit configured to transmit the amplified electromagnetic leakage shielding signal.

In this case, the shielding signal pattern generation unit may generate the shielding signal pattern of a sample rate band including an operating frequency band, a guard frequency band, and an image frequency band.

In this case, the shielding signal pattern generation unit may generate the shielding signal pattern in a time domain by performing an Inverse Fast Fourier Transform (IFFT) on the sample rate band of a complex conjugated mirror form.

In this case, the operating frequency band may include the at least one radiation band and the radiation suppression band.

In this case, the shielding signal pattern generation unit may assign a valid subcarrier to the radiation band, and may generate the shielding signal pattern by nulling at least one of the radiation suppression band, the guard frequency band, and the image frequency band.

In this case, the shielding signal pattern generation unit may divide the sample rate band into divided sample rate bands, the number of divided sample rate bands corresponding to the number of subcarriers, and may generate the shielding signal pattern by assigning the valid subcarrier to one or more of the divided sample rate bands and nulling remaining divided sample rate bands except for the divided sample rate bands assigned by the valid subcarrier.

In this case, the shielding signal pattern generation unit may generate the shielding signal pattern by assigning the valid subcarrier to the image frequency band, the image frequency band being in a complex conjugated mirror relation with the radiation band.

In this case, the apparatus may further include a user interface unit for setting at least one of the sample rate band, the radiation band, the radiation suppression band, and the transmitting power by a user.

In this case, the shielding signal pattern generation unit may optimize a Peak to Average Power Ratio (PAPR) of the shielding signal pattern.

In this case, the shielding signal pattern generation unit may generate the shielding signal pattern by assigning a random valid subcarrier to the radiation band, and may perform an update with the shielding signal pattern.

Furthermore, an embodiment of the present invention provides a method of preventing information leakage, including: generating a shielding signal pattern including a radiation band and a radiation suppression band; generating an electromagnetic leakage shielding signal corresponding to an Orthogonal Frequency Division Multiplexing (OFDM) scheme by using the shielding signal pattern; amplifying a transmitting power of the electromagnetic leakage shielding signal; and transmitting the amplified electromagnetic leakage shielding signal.

In this case, the generating the shielding signal pattern may generate the shielding signal pattern of a sample rate band including an operating frequency band, a guard frequency band, and an image frequency band.

In this case, the generating the shielding signal pattern may generate the shielding signal pattern in a time domain by performing an Inverse Fast Fourier Transform (IFFT) on the sample rate band of a complex conjugated mirror form.

In this case, the operating frequency band may include the at least one radiation band and the radiation suppression band.

In this case, the generating the shielding signal pattern may assign a valid subcarrier to the radiation band, and may generate the shielding signal pattern by nulling at least one of the radiation suppression band, the guard frequency band, and the image frequency band.

In this case, the generating the shielding signal pattern may divide the sample rate band into divided sample rate bands, the number of divided sample rate bands corresponding to the number of subcarriers, and may generate the shielding signal pattern by assigning the valid subcarrier to one or more of the divided sample rate bands and nulling remaining divided sample rate bands except for the divided sample rate bands assigned by the valid subcarrier.

In this case, the generating the shielding signal pattern may generate the shielding signal pattern by assigning the valid subcarrier to the image frequency band, the image frequency band being in a complex conjugated mirror relation with the radiation band.

In this case, the method may further include setting at least one of the sample rate band, the radiation band, the radiation suppression band, and the transmitting power by a user.

In this case, the generating the shielding signal pattern may optimize a Peak to Average Power Ratio (PAPR) of the shielding signal pattern.

In this case, the generating the shielding signal pattern may generate the shielding signal pattern by assigning a random valid subcarrier to the radiation band, and may perform an update with the shielding signal pattern.

DESCRIPTION OF THE PREFERRED EMBODIMENTS

Figure 1:
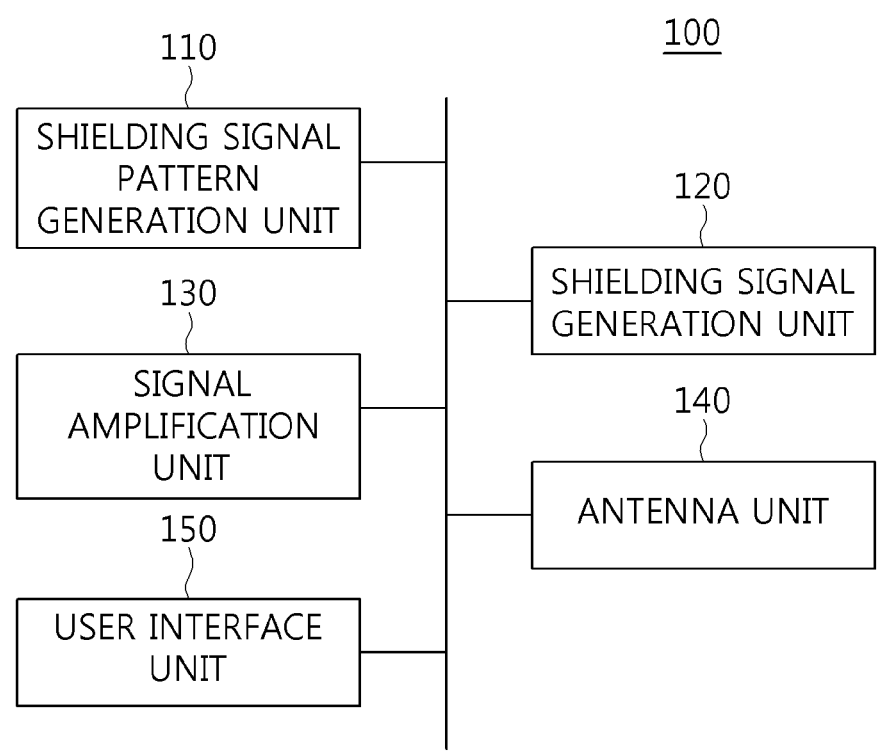
FIG. 1 is a block diagram showing a configuration of an apparatus for preventing an information leakage according to an embodiment of the present invention.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

FIG. 1 is a block diagram showing a configuration of an apparatus for preventing an information leakage according to an embodiment of the present invention.

As shown in FIG. 1, the apparatus for preventing the information leakage 100 includes a shielding signal pattern generation unit 110, a shielding signal generation unit 120, a signal amplification unit 130, an antenna unit 140, and a user interface unit 150.

First, the shielding signal pattern generation unit 110 randomly generates a shielding signal pattern, and optimizes a Peak to Average Power Ratio (PAPR).

The shielding signal pattern generation unit 110 generates the shielding signal pattern based on radiation band and radiation suppression band information. In this case, the radiation band and the radiation suppression band information may be input by a user through the user interface unit 150, or may be the information prestored in the apparatus for preventing the information leakage 100.

The shielding signal pattern generation unit 110 according to an embodiment of the present invention may generate the shielding signal pattern by performing nulling which assigns 0 to the radiation suppression band for enabling the authorized communication by suppressing the radiation of the electromagnetic leakage shielding signal at predetermined frequency position. Here, the radiation suppression band may be selectively set for every frequency in an operating band, and the number of the radiation suppression band may be not limited to a specific number.

Further, the shielding signal pattern generation unit 110, by using an Inverse Fast Fourier Transform (IFFT) signal processing scheme, may divide the sample rate band into divided sample rate bands. In this case, the number of divided sample rate bands may be the number of subcarriers. Further, the shielding signal pattern generation unit 110 may generate the shielding signal pattern in a time domain by assigning the valid subcarrier to one or more of the divided sample rate bands and nulling remaining divided sample rate bands except for the divided sample rate bands assigned by the valid subcarrier.

In this case, the shielding signal pattern generation unit 110 may assign a valid subcarrier having a random value to the radiation band corresponding to a position where the electromagnetic leakage shielding signal is generated. Further, the shielding signal pattern generation unit 110 may perform nulling which assigns 0 (zero) to a frequency domain except for the radiation band. In this way, the shielding signal pattern generation unit 110 may assign the subcarrier in the frequency domain, and may generate the shielding signal pattern in the time domain by performing the Inverse Fast Fourier Transform (IFFT).

Further, the shielding signal pattern generation unit 110, in order to generate the electromagnetic leakage shielding signal using a single digital-to-analog converter (DAC), may input the sample rate band of a complex conjugated mirror form into the Inverse Fast Fourier Transform (IFFT).

An output of the Inverse Fast Fourier Transform (IFFT) should include only a component of a real part so that the electromagnetic leakage shielding signal may be generated by using a single DAC. Accordingly, the shielding signal pattern generation unit 110 according to an embodiment of the present invention may input the sample rate band of a complex conjugated mirror form into the IFFT so that the real component may be output.

Here, the sample rate band of a complex conjugated mirror form may include an operating frequency band, a guard frequency band, and an image frequency band. Further, the operating frequency band and the image frequency band may be a mutual complex conjugated mirror relation.

Further, the shielding signal pattern generation unit 110 may generate the shielding signal pattern corresponding to an Orthogonal Frequency Division Multiplexing (OFDM) scheme by using a digital signal processing device such as a Digital Signal Processor (DSP) and a Field Programmable Gate Array (FPGA).

Further, the shielding signal pattern generation unit 110 may perform an update with the previously generated shielding signal pattern by continuously generating the shielding signal pattern. When the electromagnetic leakage shielding signal is generated by using a fixed shielding signal pattern, the shielding signal pattern may be analyzed by an information extract attacker. Accordingly, the shielding signal pattern generation unit 110 may input a random complex number ($\pm 1 \pm j$) to the Inverse Fast Fourier Transform (IFFT), and may store an output signal according to the result in a shielding signal pattern storing unit (not shown), and may manage by performing a continuous update with a prestored shielding signal pattern.

The shielding signal pattern generation unit 110 may perform a signal processing process for reducing the Peak to Average Power Ratio (PAPR) of the shielding signal pattern in the time domain which is Inverse Fast Fourier Transformed. The shielding signal pattern corresponding to the OFDM signal generally has a high PAPR. For these reasons, an efficiency and a performance of the signal amplification unit 130 may be degraded, or an output nonlinear problem may be caused.

Accordingly, the shielding signal pattern generation unit 110 according to an embodiment of the present invention may reduce the PAPR for the shielding signal pattern of the OFDM scheme corresponding to the output signal of the IFFT, and may apply the digital signal processing scheme to secure a linearity. In this case, the shielding signal pattern generation unit 110 may reduce the PAPR and may secure the linearity by applying an Iterative Clipping and Filtering (ICAF).

Next, the shielding signal generation unit 120 generates the electromagnetic leakage shielding signal corresponding to the Orthogonal Frequency Division Multiplexing (OFDM) scheme by using the shielding signal pattern.

The shielding signal generation unit 120 may generate the electromagnetic leakage shielding signal by reading the shielding signal pattern from a shielding signal pattern storing unit (not shown) where the shielding signal pattern is stored and converting the shielding signal pattern to the analog signal.

The shielding signal generation unit 120 may read the shielding signal pattern stored in the shielding signal pattern storing unit one by one in a random order, and may convert the shielding signal pattern corresponding to a digital form to the electromagnetic leakage shielding signal corresponding to an analog form by using the digital-to-analog converter (DAC).

In this case, since the shielding signal pattern is the complex conjugated mirror form, the shielding signal generation unit 120 may generate the electromagnetic leakage shielding signal from the shielding signal pattern using the single digital-to-analog converter (DAC).

Further, the signal amplification unit 130 amplifies the transmitting power of the generated electromagnetic leakage shielding signal. In this case, the signal amplification unit 130 may amplify the transmitting power of the electromagnetic leakage shielding signal generated in the shielding signal generation unit 120 based on the prestored transmitting power and the transmitting power setting information input by the user.

Next, the antenna unit 140 transmits the electromagnetic leakage shielding signal of which the transmitting power is amplified. Here, the antenna unit 140 may have at least one antenna.

Finally, the user interface unit 150 may be input at least one of the settings of the radiation band, the radiation suppression band, and the transmitting power by the user. Here, the user interface unit 150 may mean a graphical user interface (GUI) control program installed in a user terminal such as a notebook computer, a PC, a smartphone. Further, the user interface unit 150 may set the radiation band and the radiation suppression band, or may set the transmitting power by inputting a number, a character, and a graph from the user.

The user interface unit 150 may store the setting information input from the user in the setting information storing unit (not shown), and may perform update the setting information prestored in the setting information storing unit with the setting information input from the user. Further, the user interface unit 150 may perform communication with an external device using a standard computer interface scheme such as an USB, an Ethernet.

Although it is explained that the user interface unit 150 is input the setting information from the user, and the shielding signal pattern generation unit 110, the shielding signal generation unit 120, and the signal amplification unit 130 are performed based on the input setting information for the convenience of description, the present invention is not limited thereto, and when the apparatus for preventing the information leakage 100 may not include the user interface unit 150, or the apparatus for preventing the information leakage 100 may not be connected with the external device through the user interface, the apparatus for preventing the information leakage may independently operate based on the predetermined scheme or a final set scheme.

Hereinafter, a method of preventing an information leakage caused by the electromagnetic leakage performed by the apparatus for preventing the information leakage according to an embodiment of the present invention will be described in more detail with reference to FIGS. 2 to 5.

Figure 2:
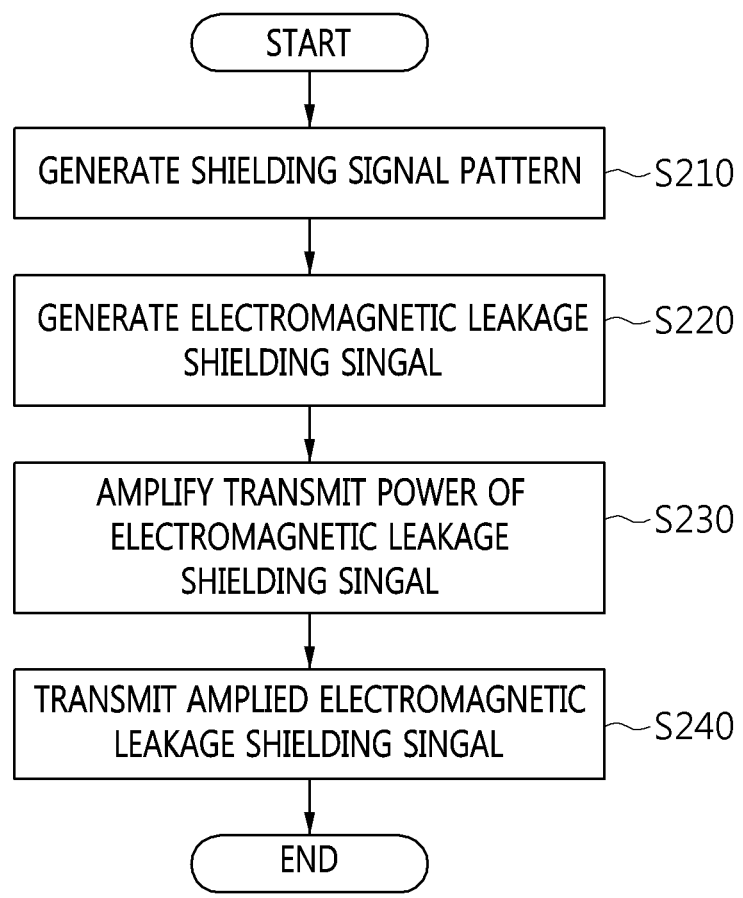
FIG. 2 is a flowchart for explaining a method of preventing an information leakage according to an embodiment of the present invention.

FIG. 2 is a flowchart for explaining a method of preventing an information leakage according to an embodiment of the present invention.

First, the apparatus for preventing the information leakage 100 generates the shielding signal pattern at step S210. The apparatus for preventing the information leakage 100, when a power supply is applied, may generate the shielding signal pattern by reading the radiation band information from a memory, the radiation band information corresponding to the frequency information which should radiate the shielding signal. In this case, the apparatus for preventing the information leakage 100 may transmit to the signal amplification unit reading the transmitting power information from the memory. The apparatus for preventing the information leakage 100, by using the Inverse Fast Fourier Transform (IFFT) signal processing scheme, may divide a 2.5 GHz sample rate band into divided sample rate bands, the number of divided sample rate bands corresponding to the number of subcarriers, and may assign the valid subcarrier to the position corresponding to a 1 GHz radiation band, and may generate the shielding signal pattern by nulling the domain except for the radiation band. Accordingly, the apparatus for preventing the information leakage 100 may generate the OFDM shielding signal pattern having a 1 GHz bandwidth.

Further, the apparatus for preventing the information leakage 100 may generate the shielding signal pattern by using the digital signal processing device such as the Digital Signal Processor (DSP) and the Field Programmable Gate Array (FPGA).

Figure 3:
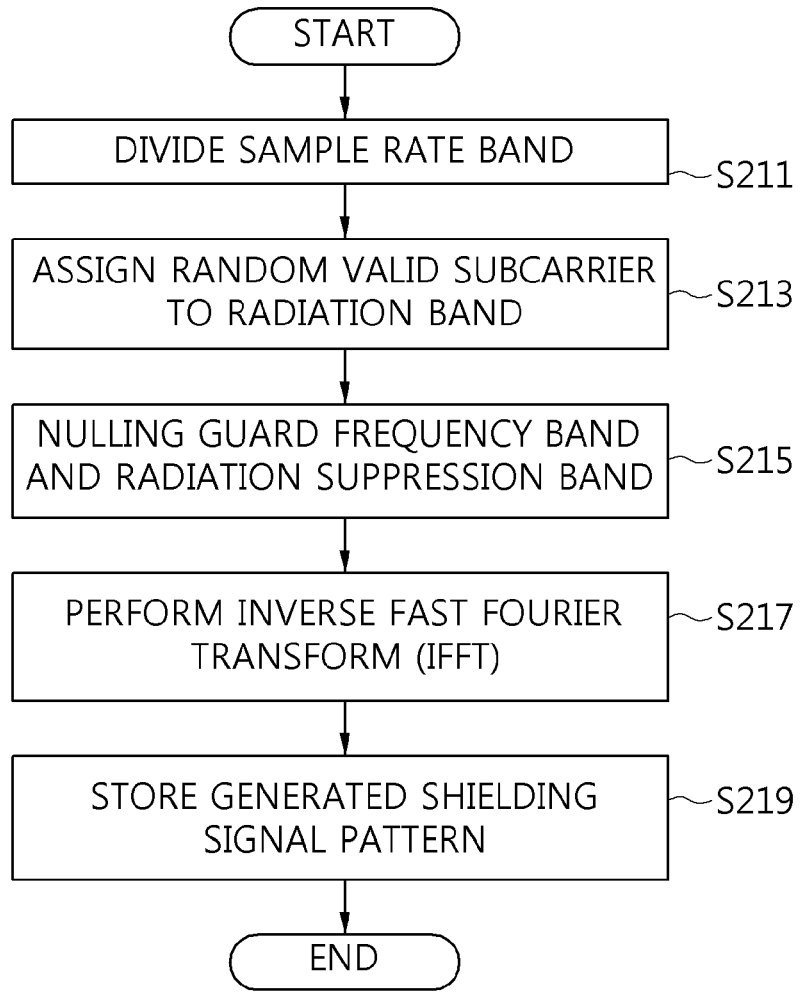
FIG. 3 is a flowchart for explaining a process of generating a shielding signal pattern at step S210 of FIG. 2.

FIG. 3 is a flowchart for explaining a process of generating a shielding signal pattern at step S210 of FIG. 2.

As shown in FIG. 3, the apparatus for preventing the information leakage 100 divides the sample rate band into divided sample rate bands, the number of divided sample rate bands corresponding to the number of subcarriers at step S211.

The apparatus for preventing the information leakage 100 may divide the sample rate band of 2.5 GHz with the number of subcarriers.

Figure 4:
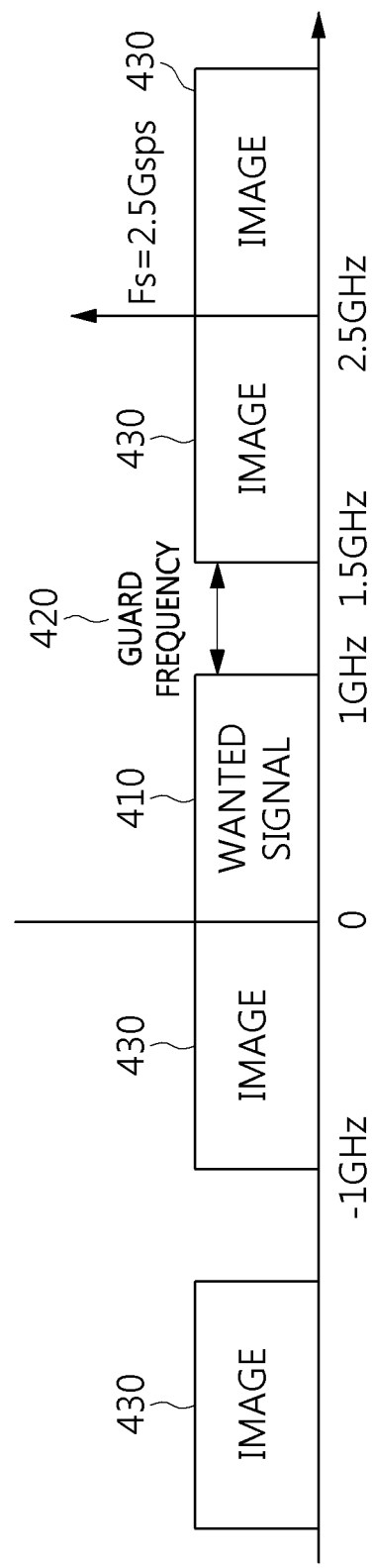
FIG. 4 is a diagram for explaining a frequency of a sample rate band according to an embodiment of the present invention.

FIG. 4 is a diagram for explaining a frequency of a sample rate band according to an embodiment of the present invention.

As shown in FIG. 4, the frequency of the sample rate band may be 2.5 GHz, and may include an operating frequency band (Wanted signal) 410, and a guard frequency band (Guard frequency) 420, and an image frequency band (Image) 430.

In particular, the operating frequency band 410 may mean the frequency band of 1 GHz or less, the guard frequency band 420 may mean the frequency band of 1 GHz to 1.5 GHz, and the image frequency band 430 may mean the frequency band of 1.5 GHz to 2.5 GHz.

When the shielding signal pattern in the time domain which is Inverse Fast Fourier Transformed (IFFT) is configured with the only component of the real part, the apparatus for preventing the information leakage 100 may be implemented using the single digital-to-analog converter (DAC) device. Accordingly, in order to enable the apparatus for preventing the information leakage 100 to be implemented with the only single digital-to-analog converter (DAC) device, the apparatus for preventing the information leakage 100 may process by inputting the input values corresponding to the complex conjugated mirror form into the IFFT in order to the output of the IFFT is configured with the only real part component.

Figure 5:
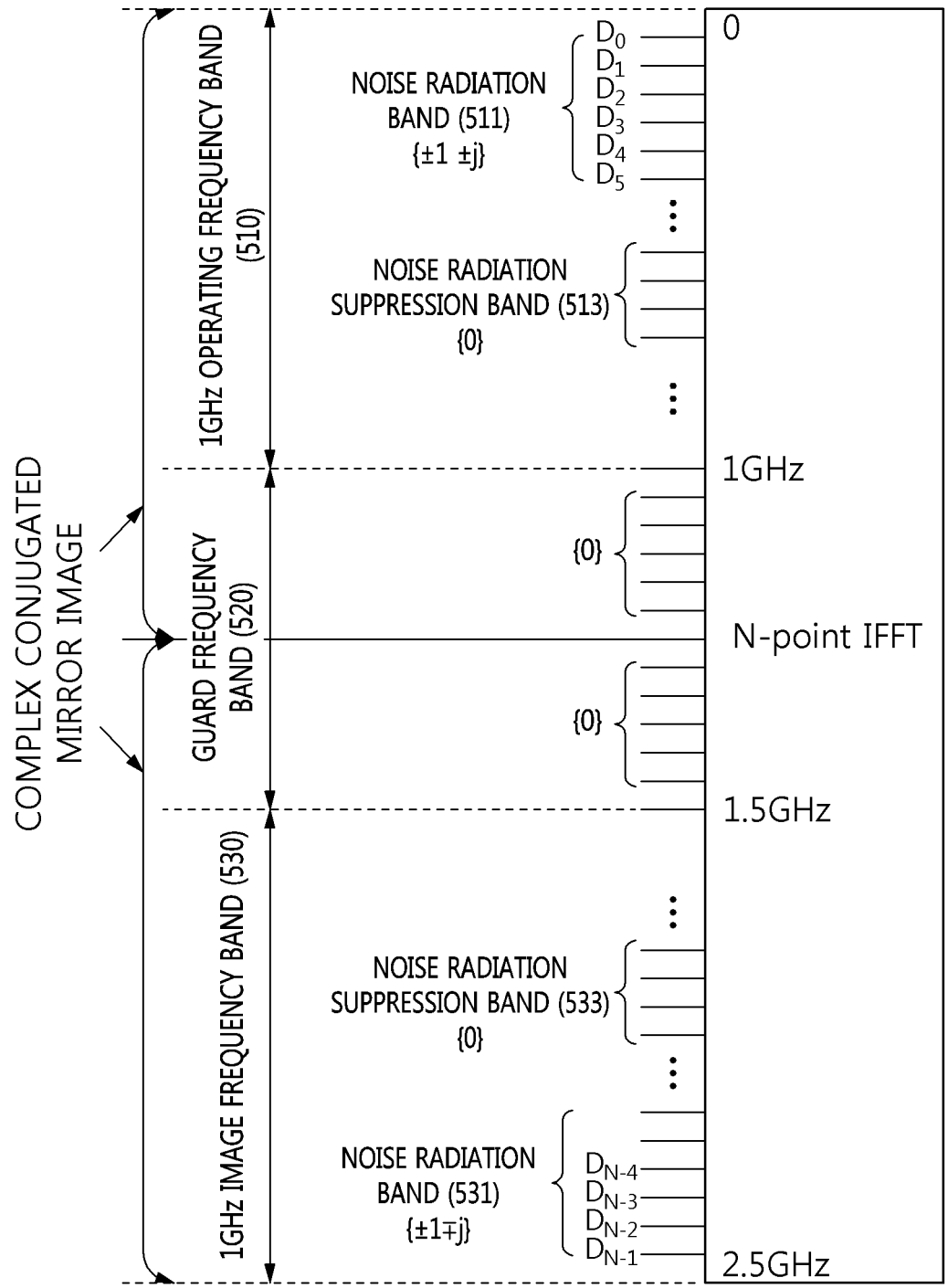
FIG. 5 is a diagram for explaining a sample rate band of a complex conjugated mirror form according to an embodiment of the present invention.

FIG. 5 is a diagram for explaining a sample rate band of a complex conjugated mirror form according to an embodiment of the present invention.

As shown in FIG. 5, the 2.5 GHz sample rate band may be the complex conjugated mirror form. Further, as shown in FIG. 5, a part of a 1 GHz operating frequency band 510 and a guard frequency band 520 may be in a complex conjugated mirror relation with a part of a 1 GHz image frequency band 530 and the guard frequency band 520. For example, when the number of the subcarriers is N and the 2.5 GHz sample rate band is divided with N, if the 0th input of the IFFT, $D_0$, is +1+j, the (N−1)th input, $D_{N-1}$, would be +1−j.

Referring again to FIG. 3, the apparatus for preventing the information leakage 100 assigns a random valid subcarrier to the radiation band at step S213.

The apparatus for preventing the information leakage 100 assigns the valid subcarrier having a random value to a position corresponding to a first radiation band 511 of the 1 GHz operating frequency band 510. In this case, the apparatus for preventing the information leakage 100 may assign the valid subcarrier to a second radiation band 531 of the 1 GHz image frequency band 530 corresponding to the first radiation band 511.

Further, the apparatus for preventing the information leakage 100 is nulling the guard frequency band and the radiation suppression band at step S215.

The apparatus for preventing the information leakage 100 may perform nulling which assigns 0 to the frequency domain except for the first radiation band 511. In particular, the apparatus for preventing the information leakage 100 may nulling a first radiation suppression band 513 of the operating frequency band 510, and a second radiation suppression band 533 of the image frequency band 530 corresponding to the first radiation suppression band 513 of the guard frequency band 520 and the operating frequency band 510.

The apparatus for preventing the information leakage 100 may generate the electromagnetic leakage shielding signal which is suppressed the radiation signal in a frequency band corresponding to the first radiation suppression band 513, by nulling the first radiation suppression band 513, and the second radiation suppression band 533 which is in a complex conjugated mirror relation with the first radiation suppression band 513.

In this way, the apparatus for preventing the information leakage 100 according to an embodiment of the present invention may suppress the digital frequency radiation by applying an IFFT subcarrier nulling technique. Accordingly, the apparatus for preventing the information leakage 100 may have no limitation on the number and the position of the radiation suppression band, and may be implemented by changing the predetermined frequency band which the user desires by software.

Next, the apparatus for preventing the information leakage 100 performs the Inverse Fast Fourier Transform (IFFT) at step S217, and stores a generated shielding signal pattern at step S219.

The apparatus for preventing the information leakage 100 may generate the shielding signal pattern in the time domain by performing the Inverse Fast Fourier Transform (IFFT) after assigning the subcarrier having a random value in the frequency domain. In this case, the apparatus for preventing the information leakage 100 may generate the shielding signal pattern assigning a subcarrier corresponding to a random complex number (±1±j), and may update and store the shielding signal pattern, thereby lowering a risk of pattern analysis by the information extract attacker.

Referring again to FIG. 2, the apparatus for preventing the information leakage 100 generates the electromagnetic leakage shielding signal based on the shielding signal pattern at step S220.

The apparatus for preventing the information leakage 100 reads the stored shielding signal pattern and convert it into the signal corresponding to the analog form. In this case, the apparatus for preventing the information leakage 100 may generate the electromagnetic leakage shielding signal corresponding to the analog form by reading the shielding signal pattern at a sample rate of 2.5 GHz.

Next, the apparatus for preventing the information leakage 100 amplifies the transmitting power of the electromagnetic leakage shielding signal at step S230.

The apparatus for preventing the information leakage 100 amplifies the power of the electromagnetic leakage shielding signal to enable blocking an information leakage caused by the electromagnetic leakage. In this case, the apparatus for preventing the information leakage 100 may amplify the transmitting power of the electromagnetic leakage shielding signal so as to correspond to the transmitting power input from the user, or may amplify the transmitting power of the electromagnetic leakage shielding signal so as to correspond to the prestored transmitting power setting information.

Depending on an environment in which the apparatus for preventing the information leakage 100 is installed, the transmitting power of the electromagnetic leakage shielding signal necessary for shielding the information leakage caused by the electromagnetic leakage may be different. Accordingly, the apparatus for preventing the information leakage 100 amplifies the transmitting power of the electromagnetic leakage shielding signal so that the electromagnetic leakage shielding signal may be transmitted with the transmitting power suitable for the environment in which the apparatus for preventing the information leakage 100 is installed.

Finally, the apparatus for preventing the information leakage 100 transmits the amplified electromagnetic leakage shielding signal at step S240.

The apparatus for preventing the information leakage 100 may transmit the electromagnetic leakage shielding signal of which the transmitting power is amplified through the antenna. That is, the electromagnetic leakage shielding signal is radiated in the form of the electromagnetic wave through the antenna.

Figure 6:
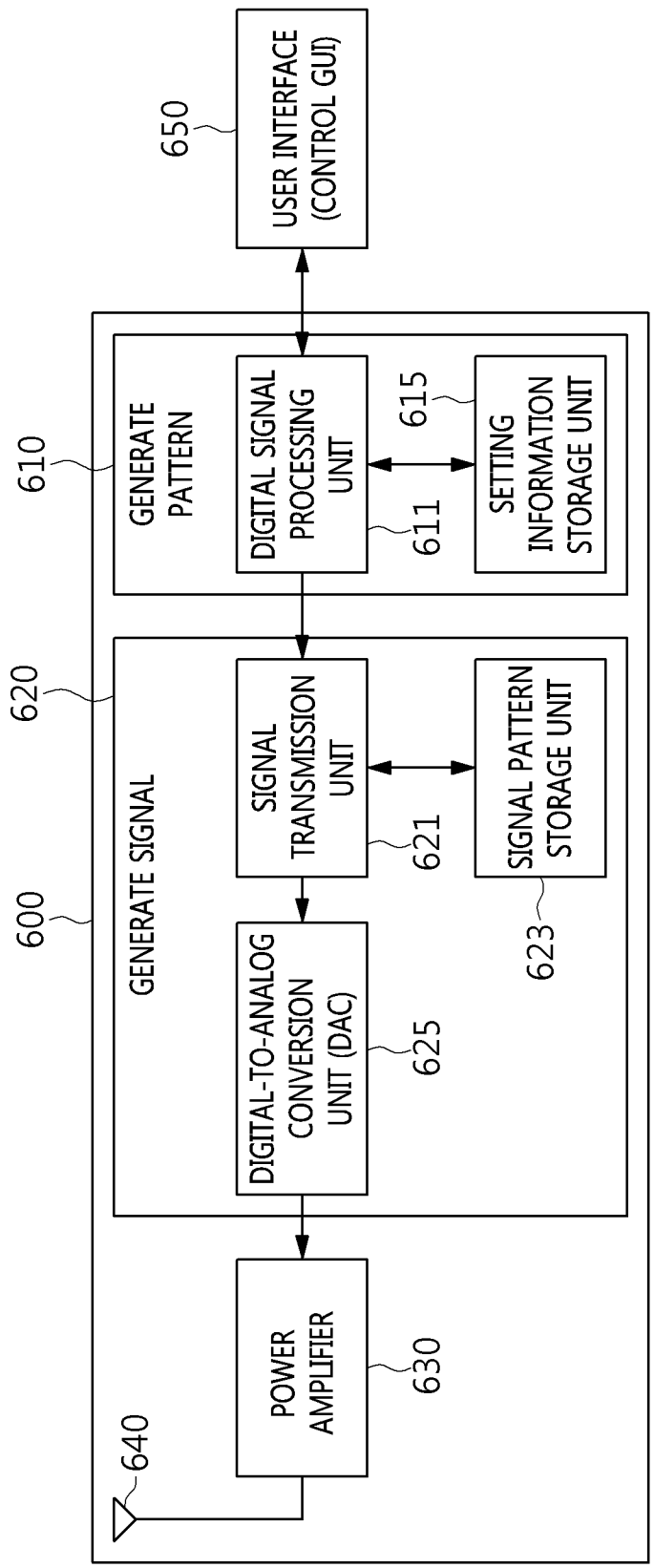
FIG. 6 is a block diagram showing a configuration of an apparatus for preventing an information leakage according to another embodiment of the present invention.

FIG. 6 is a block diagram showing a configuration of an apparatus for preventing an information leakage according to another embodiment of the present invention.

As shown in FIG. 6, the apparatus for preventing the information leakage 600 may include a pattern generation unit 610, a signal generation unit 620, a power amplifier 630, an antenna 640, and a user interface 650.

The pattern generation unit 610 may include a digital signal processing unit 611 and a setting information storage unit 615. The digital signal processing unit 611 reads the frequency information which should radiate the electromagnetic leakage shielding signal in the setting information storage unit 615, and generates the electromagnetic leakage shielding signal. Here, the frequency information which should radiate the electromagnetic leakage shielding signal may mean the radiation band and the radiation suppression band. Further, the setting information storage unit 615 may store the information of the radiation band, the radiation suppression band, and the transmitting power, etc.

The pattern generation unit 610 may perform substantially the same function as the shielding signal pattern generation unit 110 shown in FIG. 1, so that repeated descriptions will be omitted.

Next, the signal generation unit 620 may include a signal transmission unit 621, a signal pattern storage unit 623, and a digital-to-analog conversion unit (DAC) 625.

The signal transmission unit 621 reads the shielding signal pattern from the signal pattern storage unit 623 which stores the shielding signal pattern, and transmits the shielding signal pattern to the digital-to-analog conversion unit (DAC) 625. Further, the digital-to-analog conversion unit (DAC) 625 receives the shielding signal pattern from the signal transmission unit 621 at a sample rate of 2.5 GHz or more, and converts the shielding signal pattern into the analog signal.

In this case, the signal transmission unit 621 may read the stored shielding signal pattern one by one from the signal pattern storage unit 623 storing the shielding signal pattern in a random order, and may transmit the read shielding signal pattern to the digital-to-analog conversion unit (DAC) 625 through a high speed interface. Here, the high speed interface may mean a Low Voltage Differential Signaling (LVDS) transmission method, and the type of the high speed interface is not limited thereto.

The signal generation unit 620 may perform substantially the same function as the shielding signal generation unit 120 shown in FIG. 1, so that repeated descriptions will be omitted.

Further, the power amplifier 630 amplifies the transmitting power of the electromagnetic leakage shielding signal corresponding to the analog signal, and transmits the amplified transmitting power of the electromagnetic leakage shielding signal to the antenna 640. The power amplifier 630 may perform substantially the same function as the signal amplification unit 130 shown in FIG. 1, so that repeated descriptions will be omitted.

Next, the antenna 640 transmits the electromagnetic leakage shielding signal of which the transmitting power is amplified by the power amplifier 630. The electromagnetic leakage shielding signal may be radiated in the electromagnetic wave form through the antenna 640. Here, the antenna 640 may perform substantially the same function as the antenna unit 140 shown in FIG. 1, so that repeated descriptions will be omitted.

Finally, the user interface 650 may set at least one of the sample rate band, the radiation band, the radiation suppression band, and the transmitting power by the user.

Further, the user interface 650 may be implemented as a graphical user interface (GUI) form installed in a notebook computer, a PC, and a server computer, etc., or may be implemented as a standard computer interface scheme such as an USB, an Ethernet. The user interface 650 may perform substantially the same function as the user interface unit 150 shown in FIG. 1, so that repeated descriptions will be omitted.

Figure 7:
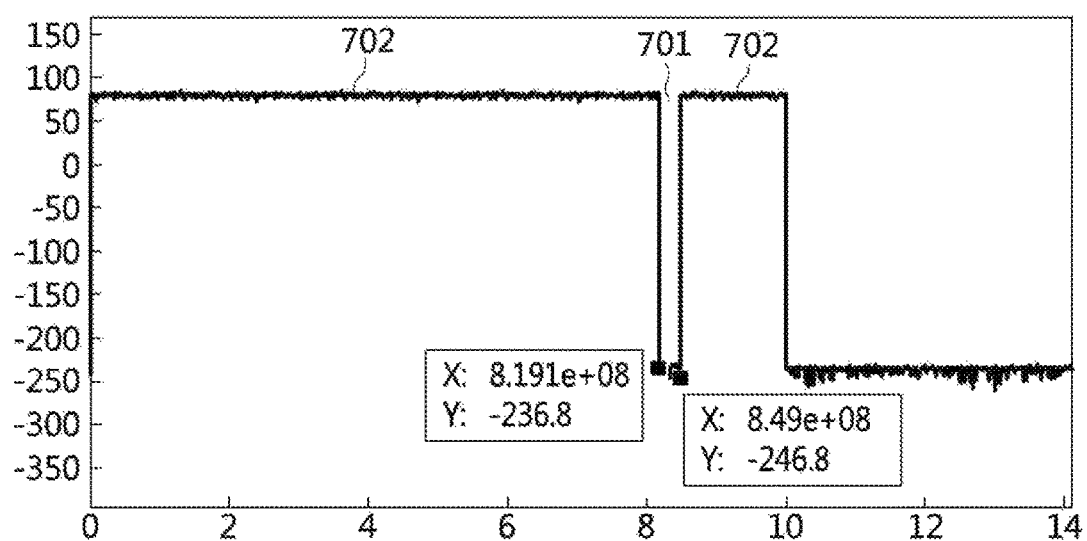
FIG. 7 is a graph showing an electromagnetic leakage shielding signal according to an embodiment of the present invention.

FIG. 7 is a graph showing an electromagnetic leakage shielding signal according to an embodiment of the present invention.

For example, when a frequency band from 819 MHz to 849 MHz is set to the radiation suppression band 701, the electromagnetic leakage shielding signal may be as shown in FIG. 7. As shown in FIG. 7, the radiation of the electromagnetic leakage shielding signal is suppressed in the frequency range corresponding to the radiation suppression band 701, and the electromagnetic leakage shielding signal having a flat output may be generated in the radiation band 702, other than the radiation suppression band 701 within 1 GHz.

Figure 8:
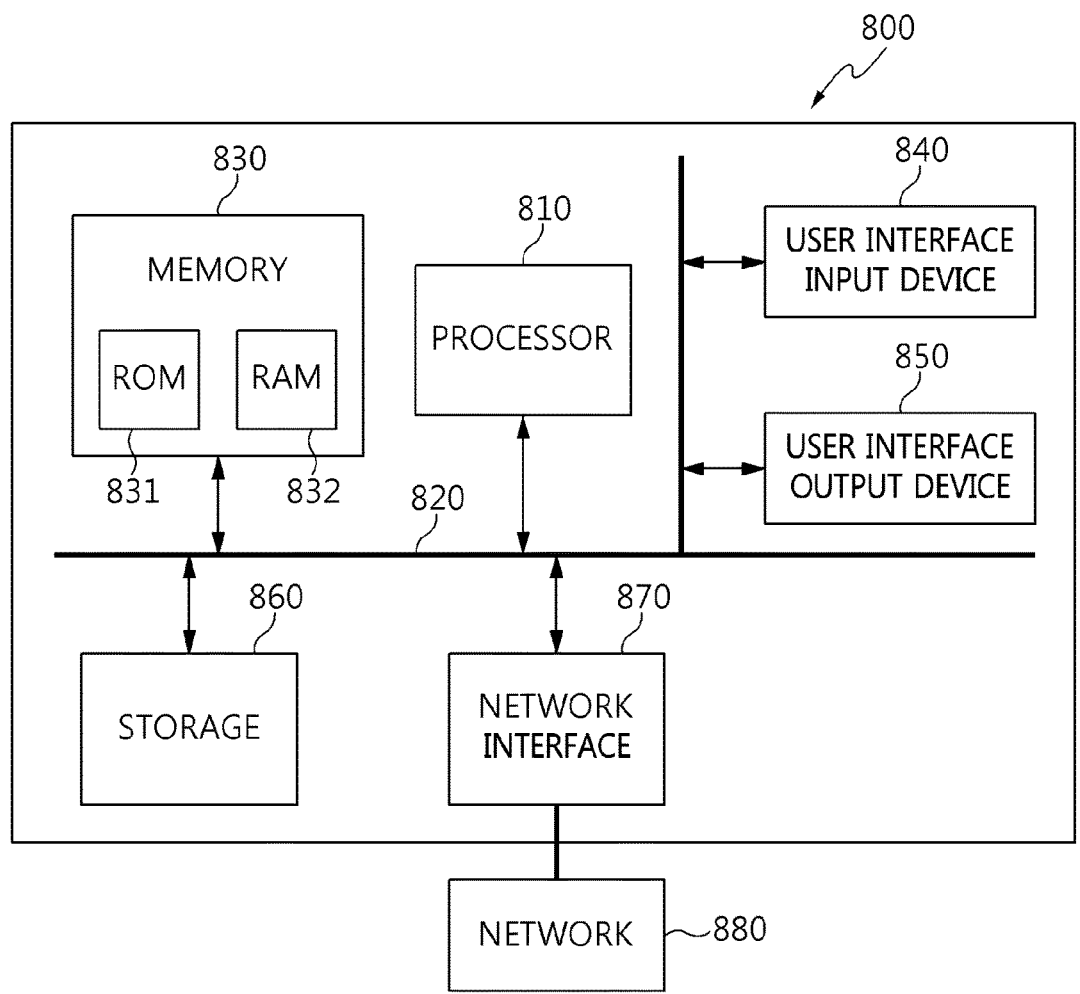
FIG. 8 is a block diagram showing a computer system according to an embodiment of the present invention.

FIG. 8 is a block diagram showing a computer system according to an embodiment of the present invention.

Referring to FIG. 8, the embodiment of the present invention may be implemented in a computer system 800, such as a computer-readable storage medium. As shown in FIG. 8, the computer system 800 may include one or more processors 810, a memory 830, a user interface input device 840, a user interface output device 850, and a storage 860, which communicate with each other through a bus 820. The computer system 800 may further include a network interface 870 connected to a network 880. Each processor 810 may be a Central Processing Unit (CPU) or a semiconductor device for executing processing instructions stored in the memory 830 or the storage 860. Each of the memory 830 and the storage 860 may be any of various types of volatile or nonvolatile storage media. For example, the memory may include Read Only Memory (ROM) 831 or Random Access Memory (RAM) 832.

Accordingly, the embodiments of the present invention may be implemented as a method using a computer or may be implemented as a nonvolatile recording medium. When the computer readable commands are executed by the processor, the computer readable commands may be capable of executing the method according to at least one aspect of the present invention.

According to the present invention, it can maximize the effect of preventing an information leakage caused by an electromagnetic leakage by transmitting an equal electromagnetic leakage shielding signal.

Furthermore, according to the present invention, it generates the electromagnetic leakage shielding signal by selectively setting a radiation frequency and a radiation suppression frequency so that the shielding signal generation can be performed efficiently and concisely.

Furthermore, according to the present invention, it enables a communication for an authorized frequency, and it can simultaneously prevent an information leakage caused by an electromagnetic leakage.

Furthermore, according to the present invention, it readily changes a radiation frequency and a radiation suppression frequency so that it can immediately cope with a rapid change of a communication environment.

Furthermore, according to the present invention, it can transmit an electromagnetic leakage shielding signal suitable for a local or a national situation by using a single equipment.

As described above, the apparatus and the method for preventing the information leakage according to the present invention, the configurations and schemes in the above-described embodiments are not limitedly applied, and some or all of the above embodiments can be selectively combined and configured so that various modifications are possible.

What is claimed is:

1. An apparatus for preventing an information leakage, comprising:
   a shielding signal pattern generation unit configured to generate a shielding signal pattern including a radiation band and a radiation suppression band;
   a shielding signal generation unit configured to generate an electromagnetic leakage shielding signal corresponding to an Orthogonal Frequency Division Multiplexing (OFDM) scheme by using the shielding signal pattern;
   a signal amplification unit configured to amplify a transmitting power of the electromagnetic leakage shielding signal; and
   an antenna unit configured to transmit the amplified electromagnetic leakage shielding signal,
   wherein the shielding signal pattern generation unit generates the shielding signal pattern of a sample rate band including an operating frequency band, a guard frequency band, and an image frequency band.

2. The apparatus of claim 1, wherein the shielding signal pattern generation unit generates the shielding signal pattern in a time domain by performing an Inverse Fast Fourier Transform (IFFT) on the sample rate band of a complex conjugated mirror form.

3. The apparatus of claim 2, wherein the operating frequency band includes the at least one radiation band and the radiation suppression band.

4. The apparatus of claim 3, wherein the shielding signal pattern generation unit assigns a valid subcarrier to the radiation band, and generates the shielding signal pattern by nulling at least one of the radiation suppression band, the guard frequency band, and the image frequency band.

5. The apparatus of claim 4, wherein the shielding signal pattern generation unit divides the sample rate band into divided sample rate bands, the number of divided sample rate bands corresponding to the number of subcarriers, and generates the shielding signal pattern by assigning the valid subcarrier to one or more of the divided sample rate bands and nulling remaining divided sample rate bands except for the divided sample rate bands assigned by the valid subcarrier.

6. The apparatus of claim 5, wherein the shielding signal pattern generation unit generates the shielding signal pattern by assigning the valid subcarrier to the image frequency band, the image frequency band being in a complex conjugated mirror relation with the radiation band.

7. The apparatus of claim 1, further comprising:
a user interface unit for setting at least one of a sample rate band, the radiation band, the radiation suppression band, and the transmitting power by a user.

8. The apparatus of claim 1, wherein the shielding signal pattern generation unit optimizes a Peak to Average Power Ratio (PAPR) of the shielding signal pattern.

9. The apparatus of claim 1, wherein the shielding signal pattern generation unit generates the shielding signal pattern by assigning a random valid subcarrier to the radiation band, and performs an update with the shielding signal pattern.

10. A method of preventing information leakage, comprising:
generating a shielding signal pattern including a radiation band and a radiation suppression band;
generating an electromagnetic leakage shielding signal corresponding to an Orthogonal Frequency Division Multiplexing (OFDM) scheme by using the shielding signal pattern;
amplifying a transmitting power of the electromagnetic leakage shielding signal; and
transmitting the amplified electromagnetic leakage shielding signal,
wherein the generating the shielding signal pattern generates the shielding signal pattern of a sample rate band including an operating frequency band, a guard frequency band, and an image frequency band.

11. The method of claim 10, wherein the generating the shielding signal pattern generates the shielding signal pattern in a time domain by performing an Inverse Fast Fourier Transform (IFFT) on the sample rate band of a complex conjugated mirror form.

12. The method of claim 11, wherein the operating frequency band includes the at least one radiation band and the radiation suppression band.

13. The method of claim 12, wherein the generating the shielding signal pattern assigns a valid subcarrier to the radiation band, and generates the shielding signal pattern by nulling at least one of the radiation suppression band, the guard frequency band, and the image frequency band.

14. The method of claim 13, wherein the generating the shielding signal pattern divides the sample rate band into divided sample rate bands, the number of divided sample rate bands corresponding to the number of subcarriers, and generates the shielding signal pattern by assigning the valid subcarrier to one or more of the divided sample rate bands and nulling remaining divided sample rate bands except for the divided sample rate bands assigned by the valid subcarrier.

15. The method of claim 14, wherein the generating the shielding signal pattern generates the shielding signal pattern by assigning the valid subcarrier to the image frequency band, the image frequency band being in a complex conjugated mirror relation with the radiation band.

16. The method of claim 10, further comprising:
setting at least one of a sample rate band, the radiation band, the radiation suppression band, and the transmitting power by a user.

17. The method of claim 10, wherein the generating the shielding signal pattern optimizes a Peak to Average Power Ratio (PAPR) of the shielding signal pattern.

18. The method of claim 10, wherein the generating the shielding signal pattern generates the shielding signal pattern by assigning a random valid subcarrier to the radiation band, and performs an update with the shielding signal pattern.

* * * * *